UNITED STATES PATENT OFFICE.

LÉON CERF, OF LYONS, FRANCE.

PROCESS OF MAKING AMMONIA DERIVATIVES OF SACCHARIN.

SPECIFICATION forming part of Letters Patent No. 668,164, dated February 19, 1901.

Application filed December 19, 1899. Serial No. 740,925. (Specimens.)

*To all whom it may concern:*

Be it known that I, LÉON CERF, a citizen of France, residing at Lyons, France, have invented a new and useful Manufacture of a Derivative of Ortho-Anhydrosulfamin-Benzoic Acid or Saccharin, of which the following is a full, clear, and exact description, and for which I have made applications for patents in France, dated September 2, 1899, and in Great Britain, dated October 6, 1899.

When ortho-anhydrosulfamin-benzoic acid, known also as "benzoic sulfinid" or "saccharin," having the formula—

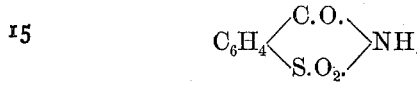

is treated with ammonia in the state of gas, a body is obtained, which according to its analysis, its properties, and reactions, appears to have the formula

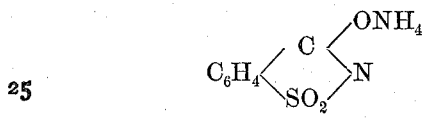

*Process of preparation.*—Through one part of saccharin in suspension in two parts of water is caused to pass a current of ammonia gas, which may be obtained either by heating a solution of ammonia or by heating a salt of ammonia in presence of lime. To obtain a perfectly pure product the ammonia-gas should be well purified and deprived of the empyreumatic products which it often contains. For this purpose it is washed by causing it to pass through a saturated solution of ammonia. It is then caused to pass through another receiver containing fragments of potash. In order to obtain the maximum yield and to obtain a product as white and pure as possible, it is preferable to effect this purification, which, nevertheless, is not indispensable, and to conduct it at the ordinary temperature. When using impure anhydrid of benzoic orthosulfamid containing a para derivative in rather large quantity, a very pure ortho-ammoniated derivative can be obtained. When the solution by ammonia of the substance in suspension in water is complete, this solution is filtered and then evaporated slowly as far as possible at a temperature below 100° centigrade. By evaporating at about the temperature of 50° centigrade and *in vacuo* a very pure product is rapidly obtained. These precautions are not, however, absolutely indispensable. When the volume of the liquor is reduced about one-third or one-fourth by evaporation, it is allowed to cool slowly and the ammoniated derivative crystallizes into beautiful dimorphous crystals. The crystals are oblique prisms, which, according to the conditions of crystallization, may be hexagonal or quadratic.

*Properties.*—The ammoniated derivative obtained by the above-described process is a neutral body, entirely organic, which being very pure can be burned without leaving any residue. When it is heated, it disengages ammonia at about 220° centigrade. It then burns completely in the air. It crystallizes in oblique prisms sometimes hexagonal and sometimes quadratic. It is extremely soluble in water. Boiling water dissolves about twice its weight of the derivative. It is only slightly soluble in cold alcohol, but more so in hot alcohol. It is insoluble in acetone, ether, acetic ether, and benzene. By fusion with resorcin or diethylamido-phenol the colored reactions of the phthaleins are obtained. From the organoleptic point of view this ammoniated derivative is very interesting. Its diluted solutions compared with those of saccharin in equal proportions, are very considerably sweeter. Physiological examination of the product compared with saccharin has demonstrated very considerable advantages over the latter. Thus in intravenous injections saccharin is toxical when a dose of fifty centigrams is administered to each kilogram of the animal, while the product forming the subject of the present invention is only toxical at eighty-five centigrams per kilogram. Being perfectly neutral, it does not injure the stomach like saccharin and does not arrest the action of the peptonizing and saccharifying ferments of digestion. Animals have been made to absorb considerable doses of the product exceeding one gram per day for each kilogram of the animal without ever causing the least unfavorable action upon the organism. The properties of this ammoniated derivative therefore show that it possesses considerable advantages of solubility, of innocuousness, and of sweetening property over saccharin.

I am aware that it has been proposed to treat saccharin with a solution of ammonia, and therefore I make no claim to such treatment; but

What I claim as my invention, and desire to secure by Letters Patent, is—

The herein-described process of obtaining a derivative of ortho-anhydrosulfamin-benzoic acid by causing ammonia-gas to pass through a mixture of ortho-anhydrosulfamin-benzoic acid with water and concentrating the product by evaporating under 100° centigrade.

In testimony whereof I affix my signature in presence of two witnesses.

LÉON CERF.

Witnesses:
  THOMAS N. BROWNE,
  GASTON JEANNIAU.